United States Patent
Wu et al.

(10) Patent No.: US 11,966,749 B2
(45) Date of Patent: Apr. 23, 2024

(54) PROCESSOR AND BOOTING METHOD THEREOF

(71) Applicant: Shanghai Zhaoxin Semiconductor Co., Ltd., Shanghai (CN)

(72) Inventors: Wenting Wu, Beijing (CN); Xiaoliang Ji, Beijing (CN); Xiuli Guo, Beijing (CN); Yanliang Liu, Beijing (CN); Qunchao Feng, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 107 days.

(21) Appl. No.: 17/737,166

(22) Filed: May 5, 2022

(65) Prior Publication Data

US 2023/0116107 A1 Apr. 13, 2023

(30) Foreign Application Priority Data

Oct. 13, 2021 (CN) .......................... 202111191217.1

(51) Int. Cl.
*G06F 9/4401* (2018.01)
(52) U.S. Cl.
CPC ................. *G06F 9/4403* (2013.01)

(58) Field of Classification Search
CPC ..... G06F 9/4401; G06F 9/4403; G06F 9/4405
See application file for complete search history.

(56) References Cited

U.S. PATENT DOCUMENTS

| | | | | |
|---|---|---|---|---|
| 6,079,016 | A * | 6/2000 | Park | G06F 9/441 |
| | | | | 714/36 |
| 6,473,857 | B1 * | 10/2002 | Panas | G06F 15/177 |
| | | | | 709/222 |
| 11,018,071 | B2 * | 5/2021 | Pinkham | G06F 1/206 |
| 11,216,282 | B2 * | 1/2022 | Feng | G06F 9/4405 |
| 11,216,284 | B2 * | 1/2022 | Liu | G06F 9/4405 |
| 2013/0151829 | A1 * | 6/2013 | Amann | G06F 12/00 |
| | | | | 713/2 |

\* cited by examiner

*Primary Examiner* — Brian T Misiura
(74) *Attorney, Agent, or Firm* — McClure, Qualey & Rodack, LLP (57) ABSTRACT

A processor includes at least one socket and at least one memory. Each socket includes a first die and a second die. The first die receives a boot-enable signal and an internal boot-enable signal to execute a boot procedure, and outputs a boot-completion signal after completing the boot procedure. The second die receives the internal boot-enable signal and the boot-completion signal from the first die to execute the boot procedure. The second die is electrically connected to the first die through a communication bus. The memory is electrically connected to the second die. When the first die executes the boot procedure, the first die accesses the memory through the communication bus and the second die.

20 Claims, 6 Drawing Sheets

PROCESSOR AND BOOTING METHOD THEREOF

CROSS REFERENCE TO RELATED APPLICATIONS

This application claims the benefit of China Application No. 202111191217.1, filed on Oct. 13, 2021, the entirety of which is/are incorporated by reference herein.

BACKGROUND OF THE INVENTION

Field of the Invention

The present invention relates to an electronic device, and, in particular, to a processor and the booting method thereof.

Description of the Related Art

With the advancements being made in semiconductor processing technology, a processor today often comprises multiple sockets. Each socket comprises a number of dies, and each die comprises one or more cores, so that the processor can process multiple functional programs at the same time, thereby increasing the computing efficiency of the processor. With the increasing complexity of the internal structure of processors, how to efficiently communicate between cores, or between die and die, and the execution of the boot procedure inside the processor becomes more and more important. In particular, how to efficiently boot a processor with multiple sockets and multiple dies has become an important issue.

BRIEF SUMMARY OF THE INVENTION

An embodiment of the present invention provides a processor that comprises at least one socket and at least one memory. Each socket comprises a first die and a second die. The first die receives a boot-enable signal and an internal boot-enable signal to execute a boot procedure, and outputs a boot-completion signal after completing the boot procedure. The second die receives the internal boot-enable signal and the boot-completion signal from the first die to execute the boot procedure. The second die is electrically connected to the first die through a communication bus. The memory is electrically connected to the second die. When the first die executes the boot procedure, the first die accesses the memory through the communication bus and the second die.

According to the processor described above, the first die comprises a first communication controller. The second die comprises a second communication controller. The first communication controller and the second communication controller are used to control access to the memory.

According to the processor described above, when the first die executes the boot procedure, the first communication controller accesses the memory through the communication bus, and the second communication controller prohibits access to the memory.

According to the processor described above, when the second die executes the boot procedure, the first communication controller prohibits access to the memory through the communication bus, and the second communication controller accesses the memory.

The present invention also provides a processor having at least two sockets and a memory. One socket comprises a first die and a second die. The first die receives a boot-enable signal and an internal boot-enable signal to execute a boot procedure, and outputs a first boot-completion signal after completing the boot procedure. The second die receives the internal boot-enable signal and the first boot-completion signal from the first die to execute the boot procedure, and outputs a second boot-completion signal after completing the boot procedure. The second die is electrically connected to the first die through a first communication bus. The other socket comprises a third die and a fourth die. The third die receives the second boot-completion signal from the second die and the internal boot-enable signal to execute the boot procedure, and outputs a third boot-completion signal after completing the boot procedure. The fourth die receives the second boot-completion signal from the second die and the third boot-completion signal from the third die to execute the boot procedure. The fourth die is electrically connected to the third die through a second communication bus. The memory is electrically connected to the second die and the fourth die. When the first die executes the boot procedure, the first die accesses the memory through the first communication bus and the second die.

According to the processor described above, when the first die executes the boot procedure, the second die prohibits access to the memory, the third die prohibits access to the memory through the second communication bus, and the fourth die prohibits access to the memory.

According to the processor described above, when the second die executes the boot procedure, the second die accesses the memory, the first die prohibits access to the memory through the first communication bus, the third die prohibits access to the memory through the second communication bus, and the fourth die prohibits access to the memory.

According to the processor described above, when the third die executes the boot procedure, the second die cuts off the electrical connection between the second die and the memory, the third die accesses the memory through the second communication bus, and the fourth die prohibits access to the memory.

According to the processor described above, when the fourth die executes the boot procedure, the third die prohibits access to the memory through the second communication bus, and the fourth die accesses the memory.

According to the processor described above, the boot sequence of the processor is the first die, the second die, the third die, and the fourth die.

An embodiment of the present invention provides a booting method for a processor. The booting method is applicable to processors having at least one socket and at least one memory. The socket comprises a first die and a second die. The memory is electrically connected to the second die. The second die is electrically connected to the first die through a communication bus. The booting method comprises the following actions. A boot-enable signal and an internal boot-enable signal are received so that the first die may execute a boot procedure. A boot-completion signal is output after the boot procedure of the first die is complete. The boot-enable signal and the boot-completion signal are received from the first die, so that the second die may execute the boot procedure. The memory is accessed through the communication bus and the second die by the first die when the first die executes the boot procedure.

According to the booting method described above, the first die comprises a first communication controller, the second die comprises a second communication controller, and the first communication controller and the second communication controller are used to control access to the memory.

According to the booting method described above, the method further comprises using the first communication controller to access the memory through the communication bus when the first die executes the boot procedure, and prohibiting access to the memory via the second communication controller when the first die executes the boot procedure.

According to the booting method described above, the method further comprises the first communication controller prohibiting access to the memory through the communication bus when the second die executes the boot procedure, and having the second communication controller access the memory when the second die executes the boot procedure.

The present invention also provides a booting method for a processor. The booting method is applicable to processors having at least two sockets and a memory. One socket comprises a first die and a second die. The other socket comprises a third die and a fourth die. The memory is electrically connected to the second die and the fourth die. The second die is electrically connected to the first die through a first communication bus. The fourth die is electrically connected to the third die through a second communication bus. The booting method comprises receiving a boot-enable signal and an internal boot-enable signal, so that the first die executes a boot procedure; outputting a first boot-completion signal after completing the boot procedure of the first die; receiving the boot-enable signal and the boot-completion signal from the first die, so that the second die executes the boot procedure; outputting a second boot-completion signal after completing the boot procedure of the second die; receiving the second boot-completion signal from the second die and the internal boot-enable signal, so that the third die executes the boot procedure; outputting a third boot-completion signal after completing the boot procedure of the third die; receiving the second boot-completion signal from the second die and the third boot-completion signal from the third die, so that the fourth die executes the boot procedure; and accessing the memory through the first communication bus and the second die by the first die when the first die executes the boot procedure.

According to the booting method described above, the booting method further comprises the following steps. The method prohibits access to the memory by the second die when the first die executes the boot procedure. The method prohibits access to the memory through the second communication bus by the third die when the first die executes the boot procedure. The method prohibits access to the memory by the fourth die when the first die executes the boot procedure.

According to the booting method described above, the booting method further comprises the following steps. The method allows accesses to the memory by the second die when the second die executes the boot procedure. The method prohibits access to the memory through the first communication bus by the first die when the second die executes the boot procedure. The method prohibits access to the memory through the second communication bus by the third die when the second die executes the boot procedure. The method prohibits access to the memory by the fourth die when the second die executes the boot procedure.

According to the booting method described above, the booting method further comprises the following steps. The method cuts off the electrical connection between the second die and the memory via the second die when the third die executes the boot procedure. The method permits access to the memory through the second communication bus via the third die when the third die executes the boot procedure. The method prohibits access to the memory by the fourth die when the third die executes the boot procedure.

According to the booting method described above, the booting method further comprises the following steps. The method prohibits access to the memory through the second communication bus by the third die when the fourth die executes the boot procedure. The method allows the fourth die to access the memory when the fourth die executes the boot procedure.

According to the booting method described above, the boot sequence of the processor is the first die, the second die, the third die, and the fourth die.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
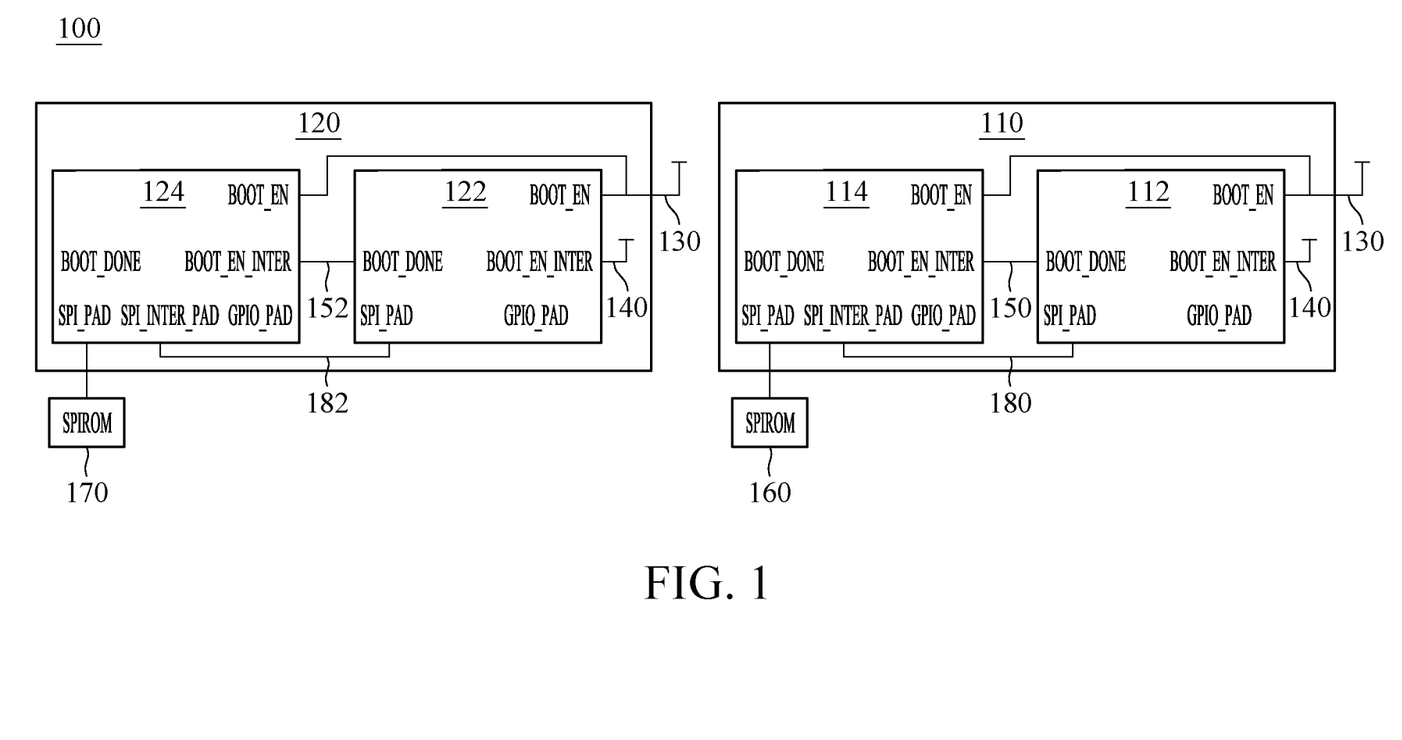
FIG. 1 is a schematic diagram of a processor 100 in accordance with some embodiments of the present invention.

FIG. 1 is a schematic diagram of a processor 100 in accordance with some embodiments of the present invention. As shown in FIG. 1, the processor 100 comprises a socket 110, a socket 120, a memory 160, and a memory 170. Although the present invention is exemplified by the processor 100 having two sockets, the present invention does not limit the number of sockets included in the processor. The socket 110 includes a die 112 and a die 114. The socket 120 includes a die 122 and a die 124. In some embodiments, each of the dies 112, 114, 122 and 124 includes at least one core. In some embodiments, the arrangement of the socket 120, the die 122, the die 124, and the memory 170 is the same as that of the socket 110, the die 112, the die 114, and the memory 160.

Taking the socket 110 as an example, the die 112 and the die 114 respectively have six ports, which are a port BOOT_EN, a port BOOT_EN_INTER, a port SPI_PAD, a port SPI_INTER_PAD, a port BOOT_DONE, and a port GPIO_PAD. The die 112 and the die 114 respectively receive a boot enable signal 130 through their ports BOOT_EN. In some embodiments, the boot-enable signal 130 may come from other functional blocks in the processor 100, or from other circuits outside the processor 100. The die 112 receives an internal boot-enable signal 140 through its port BOOT_EN_INTER. In some embodiments, the internal boot-enable signal 140 may come from other functional blocks in the socket 110, but the present invention is not limited thereto. The port BOOT_DONE of the die 112 is electrically connected to the port BOOT_EN_INTER of the die 114. The port SPI_PAD of the die 112 is electrically connected to the port SPI_INTER_PAD of the die 114. The port SPI_PAD of the die 114 is electrically connected to the memory 160.

Similarly, the die 122 and the die 124 respectively receive the boot enable signal 130 through their ports BOOT_EN. The die 122 receives the internal boot-enable signal 140 through its part BOOT_EN_INTER. The part BOOT_DONE of the die 122 is electrically connected to the port BOOT_EN_INTER of the die 124. The port SPI_PAD of the die 122 is electrically connected to the port SPI_INTER_PAD of the die 124. The port SPI_PAD of the die 124 is electrically connected to the memory 170. In some embodiments, both the memory 160 and the memory 170 are serial peripheral interface read-only memories (SPI-ROM), but the present invention is not limited thereto.

In some embodiments, the die 112 receives the boot-enable signal 130 through the port BOOT_EN (for example, the boot-enable signal 130 is "1"), and receives the internal boot-enable signal 140 through the part BOOT_EN_INTER (for example, the boot-enable signal 140 is "1"), to execute a boot procedure. After completing the boot procedure, the die 112 correspondingly outputs a boot-completion signal 150 from the port BOOT_DONE (for example, the boot-completion signal 150 is "1"). The die 114 receives the boot-enable signal 130 through the port BOOT_EN, and receives the boot-completion signal 150 from the die 112 through the port BOOT_EN_INTER, to execute the boot procedure. The port SPI_PAD of the die 112 is electrically connected to the port SPI_INTER_PAD of the die 114 through a communication bus 180. In some embodiments, when the die 112 executes the boot procedure, the die 112 accesses the memory 160 through the communication bus 180 and the die 114.

In detail, the die 112 comprises a first communication controller (not shown), and the die 114 comprises a second communication controller (not shown). The first communication controller and the second communication controller are used to control access to the memory 160. In some embodiments, when the die 112 executes the boot procedure, the first communication controller of the die 112 accesses the memory 160 through the communication bus 180, and the second communication controller of the die 114 prohibits access to the memory 160. In other words, when the die 112 executes the boot procedure, the second communication controller of the die 114 cuts off the electrical connection between the port SPI_PAD of the die 114 and the SPI communication interface inside the die 114, so that the die 114 cannot access the memory 160. On the other hand, when the die 112 executes the boot procedure, the first communication controller of the die 112 accesses the memory 160 through the port SPI_PAD of the die 112, the communication bus 180, and the ports SPI_INTER_PAD and SPI_PAD of the die 114.

Then, when the die 114 executes the boot procedure, the first communication controller of the die 112 prohibits access to the memory 160 through the communication bus 180, and the second communication controller of the die 114 accesses the memory 160 through the port SPI_PAD of the die 114. In other words, when the die 114 executes the boot procedure, the first communication controller of the die 112 cuts off the electrical connection between the port SPI_PAD of the die 112 and the SPI communication interface inside the die 112, so that the die 112 cannot access the memory 160.

In some embodiments, when the die 112 receives the boot-enable signal 130 and the internal boot-enable signal 140 to execute the boot procedure, the die 122 also receives the boot-enable signal 130 through the port BOOT_EN and receives the internal boot-enable signal 140 through the port BOOT_EN_INTER, to execute the boot procedure. After completing the boot procedure, the die 122 correspondingly outputs a boot-completion signal 152 from the port BOOT_DONE. The die 124 receives the boot-enable signal 130 through the port BOOT_EN and receives the boot-completion signal 152 from the die 122 through the port BOOT_EN_INTER, to execute the boot procedure. The port SPI_PAD of the die 122 is electrically connected to the port SPI_INTER_PAD of the die 124 through a communication bus 182. In some embodiments, when the die 122 execute the boot procedure, the die 122 accesses the memory 170 through the communication bus 182 and the die 124.

In detail, the die 122 includes a third communication controller (not shown), and the die 124 includes a fourth communication controller (not shown). The third communication controller and the fourth communication controller am used to control access to the memory 170. In some embodiments, when the die 122 executes the boot procedure, the third communication controller of the die 122 accesses the memory 170 through the communication bus 182, and the fourth communication controller of the die 124 prohibits access to the memory 170. In other words, when the die 122 executes the boot procedure, the fourth communication of the die 124 cuts off the electrical connection between the port SPI_PAD of the die 124 and the SPI communication interface inside the die 124, so that the die 124 cannot access the memory 170. On the other hand, when the die 122 executes the boot procedure, the third communication controller of the die 122 accesses the memory 170 through the port SPI_PAD of the die 122, the communication bus 182, and the ports SPI_INTER_PAD and SPI_PAD of the die 124.

Then, when the die 124 executes the boot procedure, the third communication controller of the die 122 prohibits access to the memory 170 through the communication bus 182, and the fourth communication controller of the die 124 accesses the memory 170 through the port SPI_PAD of the die 124. In other words, when the die 124 executes the boot procedure, the third communication controller of the die 122 cuts off the electrical connection between the port SPI_PAD of the die 122 and the SPI communication interface inside the die 122, so that the die 122 cannot access the memory 170.

The configuration of the processor 100 in FIG. 1 enables the socket 110 and the socket 120 to execute the boot procedure at the same time, thereby saving the boot time of the processor 100. The die 112, the die 114, the die 122, and the die 124 in FIG. 1 all have a port GPIO_PAD for electrically connecting to a device supporting a GPIO communication interface. Since the present invention does not utilize the port GPIO_PAD, it will not be repeated herein.

Figure 2:
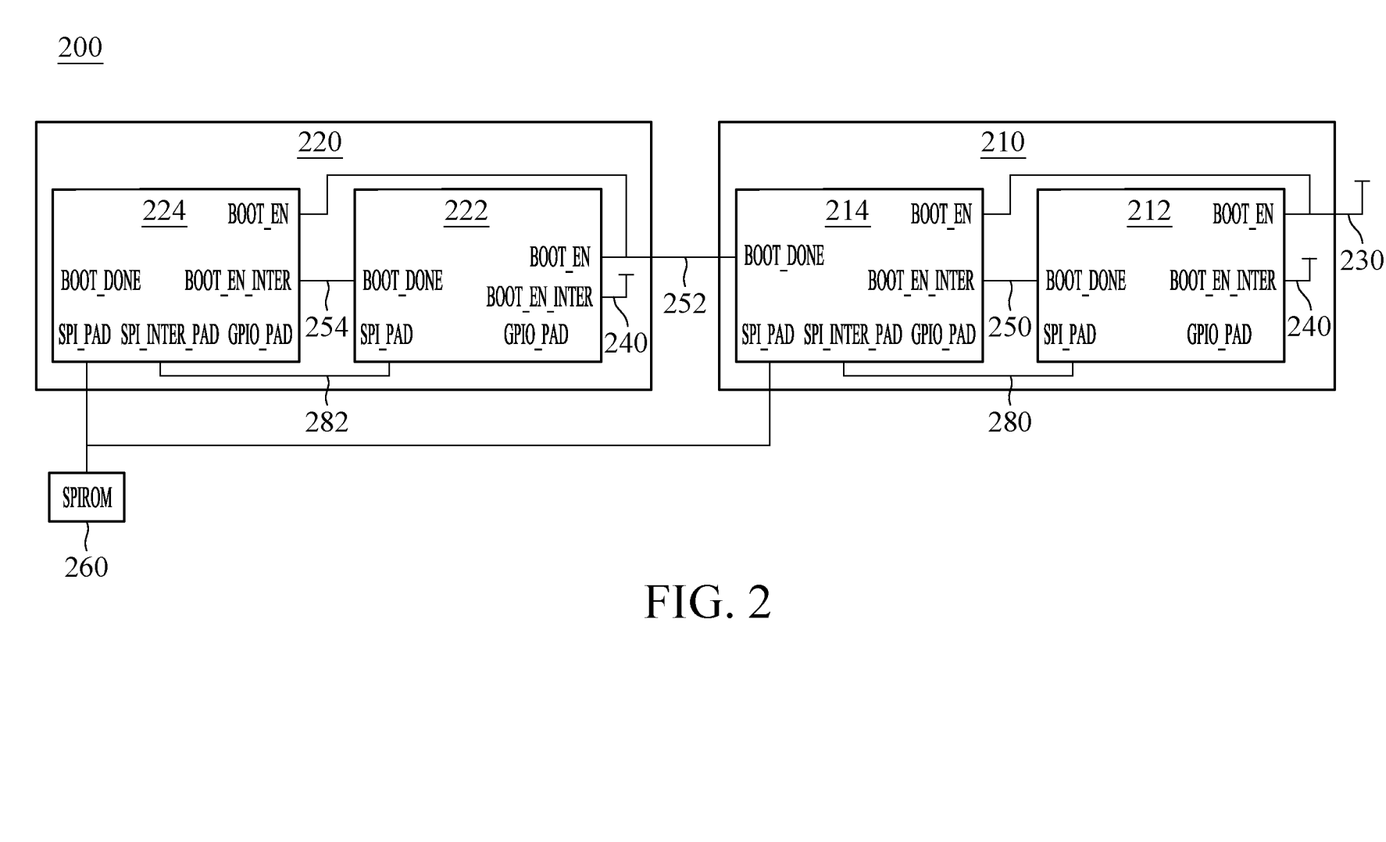
FIG. 2 is a schematic diagram of a processor 200 in accordance with some embodiments of the present invention.

FIG. 2 is a schematic diagram of a processor 200 in accordance with some embodiments of the present invention. As shown in FIG. 2, the processor 200 includes a socket 210, a socket 220, and a memory 260. Although the present invention is exemplified by the processor 200 having two sockets, the present invention does not limit the number of sockets included in the processor. The socket 210 includes a die 212 and a die 214. The socket 220 includes a die 222 and a die 224. In some embodiments, each of the dies 212, 214, 222, and 224 includes at least an core.

Same as FIG. 1, the dies 212, 214, 222, and 224 respectively have six ports, which are a port BOOT_EN, a port BOOT_EN_INTER, a port SPI_PAD, a port SPI_INTER_PAD, a port BOOT_DONE, and a port GPIO_PAD. The die 212 and the die 214 respectively receive a boot-enable signal 230 through their port BOOT_EN. In some embodiments, the boot-enable signal 230 may come from other functional blocks in the processor 200, or from other circuits outside the processor 200. The die 212 receives an internal boot-enable signal 240 through its port BOOT_EN_INTER. In some embodiments, the internal boot-enable signal 240 may come from other functional blocks in the socket 210, but the present invention is not limited thereto. The port BOOT_DONE of the die 212 is electrically connected to the port BOOT_EN_INTER of the die 214. The port SPI_PAD of the die 212 is electrically connected to the port SPI_INTER_PAD of the die 214. The port of SPI_PAD is electrically connected to the memory 260.

The ports BOOT_EN of the die 222 and the die 224 we respectively electrically connected to the port BOOT_DONE of the die 214. The die 222 receives the internal boot-enable signal 240 through its port BOOT_EN_INTER. The part BOOT_DONE of the die 222 is electrically connected to the port BOOT_EN_INTER of the die 224. The port SPI_PAD of the die 222 is electrically connected to the port SPI_INTER_PAD of the die 224. The port SPI_PAD of the die 224 is electrically connected to the memory 260.

In some embodiments, the die 212 receives the boot-enable signal 230 through the port BOOT_EN, and receives the internal boot-enable signal 240 through the port BOOT_EN_INTER, to execute a boot procedure. After completing the boot procedure, the die 212 correspondingly outputs a boot-completion signal 250 from its port BOOT_DONE. The die 214 receives the boot-enable signal 230 through the port BOOT_EN, and receives the boot-completion signal 250 from the die 212 through the port BOOT_EN_INTER, to execute the boot procedure. After completing the boot procedure, the die 214 outputs a boot-completion signal 252 through the port BOOT_DONE. The die 214 is electrically connected to the die 212 through a communication bus 280.

Then, the die 222 receives the boot-completion signal 252 from the die 214 through the port BOOT_EN, and receives the internal boot-enable signal 240 through the port BOOT_IN_INTER, to execute the boot procedure. After completing the boot procedure, the die 222 correspondingly outputs a boot-completion signal 254 from the port BOOT_DONE. The die 224 receives the boot-completion signal 252 from the die 214 through the port BOOT_EN, and receives the boot-completion signal 254 from the die 222 through the port BOOT_EN_INTER, to execute the boot procedure. The die 224 is electrically connected to the die 222 through a communication bus 282. In some embodiments, when the die 212 executes the boot procedure, the die 212 accesses the memory 260 through the communication bus 280 and the die 214. The same as the dies 112, 114, 122, and 124 in FIG. 1, each of the dies 212, 214, 222, and 224 in FIG. 2 has a communication controller (not shown) for deploying and controlling access to the memory 260.

In some embodiments, when the die 212 executes the boot procedure, the die 214 prohibits access to the memory 260, the die 222 prohibits access to the memory 260 through the communication bus 282, and the die 224 prohibits access to the memory 260. In detail, when the die 212 executes the boot procedure, the die 212 accesses the memory 260 through its port SPI_PAD, the communication bus 280, and the ports SPI_INTER_PAD and SPI_PAD of the die 214. When the die 212 executes the boot procedure, the die 214 cuts off the electrical connection between the port SPI_PAD of the die 214 and the SPI communication interface inside the die 214, so that the die 214 cannot access the memory 260.

Similarly, when the die 212 executes the boot procedure, the die 222 cuts off the electrical connection between the port SPI_PAD of the die 222 and the SPI communication interface inside the die 222, so that the die 222 cannot access the memory 260. When the die 212 executes the boot procedure, the die 224 also cuts off the electrical connection between the port SPI_PAD of the die 224 and the SPI communication interface inside the die 224, so that the die 224 cannot access the memory 260.

In same embodiments, when the die 214 executes the boot procedure, the die 214 accesses the memory 260, the die 212 prohibits access to the memory 260 through the communication bus 280, the die 222 prohibits access to the memory 260 through the communication bus 282, and the die 224 prohibits access to the memory 260. In some embodiments, when the die 222 executes the boot procedure, the die 214 cuts off the electrical connection between the second die and the memory 260, the die 222 accesses the memory 260 through the communication bus 282, and the die 224 prohibits access to the memory 260. When the die 224 executes the boot procedure, the die 222 prohibits access to the memory 260 through the communication bus 282, and the die 224 accesses the memory 260.

In general, the boot sequence of the processor 200 is the die 212, the die 214, the die 222, and the die 224 in sequence. The configuration of the processor 200 in FIG. 2 enables the socket 210 and the socket 220 to share the memory 260 to save the cost of hardware setup.

Figure 3:
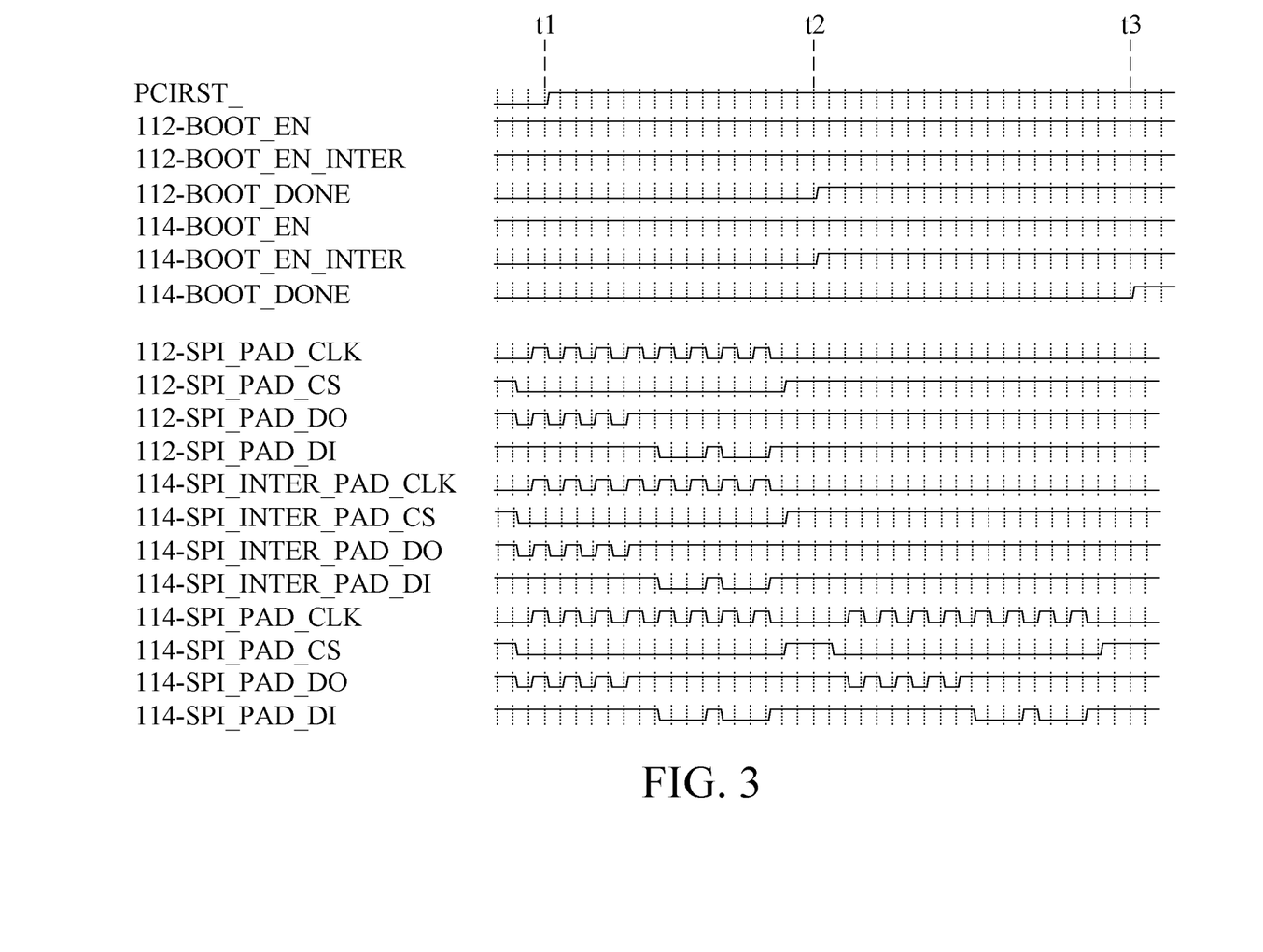
FIG. 3 is a signal-timing diagram of the processor 100 in FIG. 1 booting in accordance with some embodiments of the present invention.

FIG. 3 is a signal-timing diagram of the processor 100 in FIG. 1 booting in accordance with some embodiments of the present invention. As shown in FIG. 3, at time point t1, the signal PCIRST_changed from a low level to a high level indicates that the reset of PCI communication interface of the processor 100 is started. At time point t1, the die 112 receives the high-level boot-enable signal 130 through the port BOOT_EN, and receives the high-level internal boot-enable signal 140 through the port BOOT_EN_INTER, to start to execute the boot procedure to access the memory 160. Since the halfway path for the die 112 to access the memory 160 is the port SPI_PAD of the die 112, the port SPI_INTER_PAD of the die 114, and the port SPI_PAD of the die 114, it can be observed that the signal of port SPI_PAD of the die 112 (including the signals SPI_PAD_CLK, SPI_PAD_CS, SPI_PAD_DO, and SPI_PAD_DI) is completely the same as the signal of the port SPI_INTER_PAD of the die 114 (including the signals SPI_INTER_PAD_CLK, SPI_INTER_PAD_CS, SPI_INTER_PAD_DO, SPI_INTER_PAD_DI) and the signal of the port SPI_PAD of the die 114 (including the signals SPI_PAD_CLK, SPI_PAD_CS, SPI_PAD_DO, and SPI_PAD_DI). This proves that the same data are being transferred between the die 112 and the memory 160.

At time point t2, the die 112 completes the boot procedure and correspondingly outputs the boot-completion signal 150 from its port BOOT_DONE to the port BOOT_EN_INTER of the die 114. At time point t2, the die 114 receives the high-level boot-enable signal 130 through the port BOOT_EN, and receives the high-level boot-completion signal 150 from the die 112 through the port BOOT_EN_

INTER, and start to execute the boot procedure to access the memory 160. Since the die 114 accesses the memory 160 through the port SPI_PAD, the signal of the port SPI_PAD of the die 114 (including the signals SPI_PAD_CLK, SPI_PAD_CS, SPI_PAD_DO, SPI_PAD_DI) can be observed. At time point t3, the die 114 completes the boot procedure, so that the high-level signal can be observed on the port BOOT_DONE of the die 114.

Figure 4:
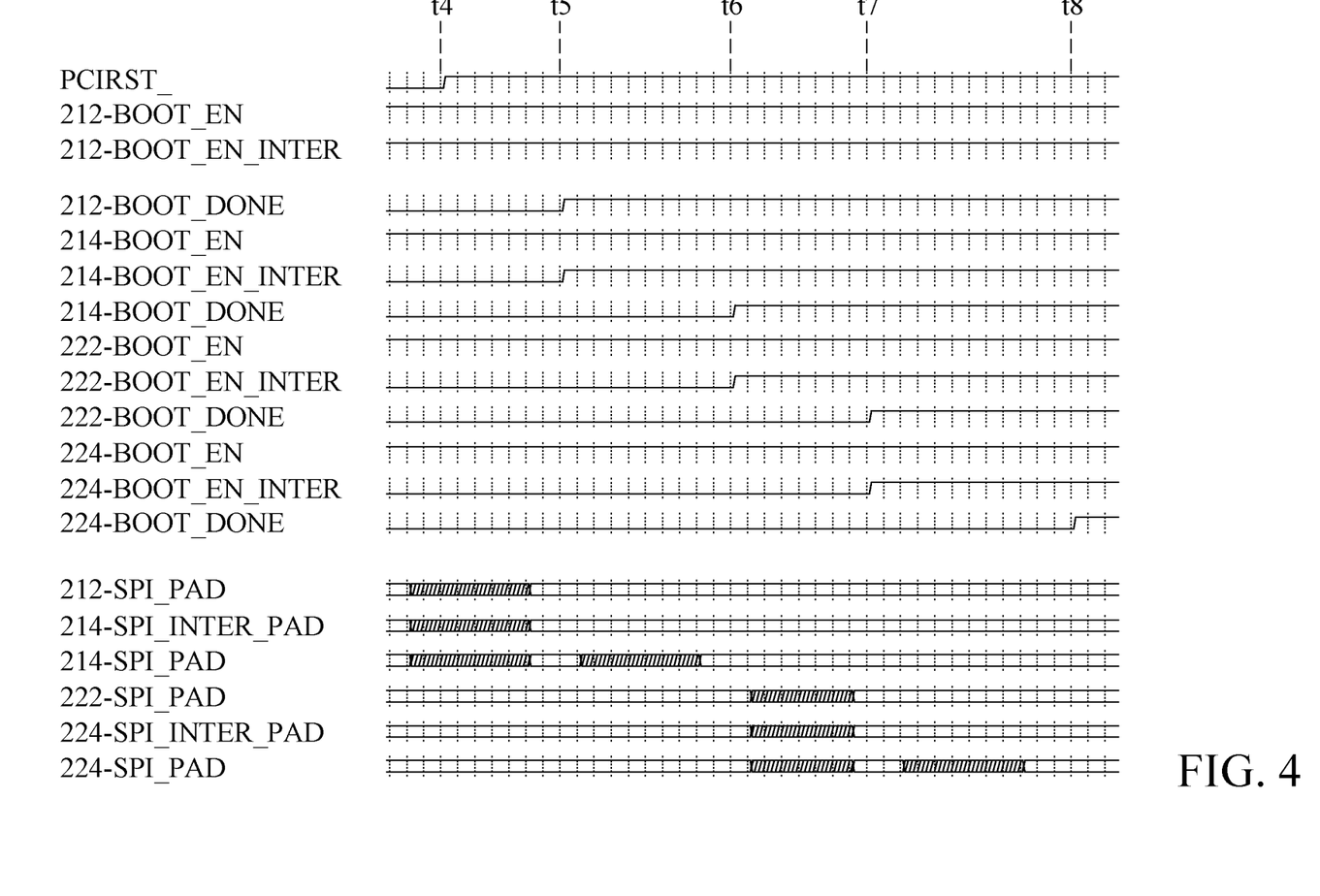
FIG. 4 is a signal-timing diagram of the processor 200 in FIG. 2 booting in accordance with some embodiments of the present invention.

FIG. 4 is a signal-timing diagram of the processor 200 in FIG. 2 booting in accordance with some embodiments of the present invention. As shown in FIG. 4, at time point t4, the signal PCIRST_changed from a low level to a high level indicates that the reset of PCI communication interface of the processor 200 is started. At time point t4, the die 212 receives the high-level boot-enable signal 230 through the port BOOT_EN, and receives the high-level internal boot-enable signal 240 through the port BOOT_EN_INTER, to start to execute the boot procedure to access the memory 260. Since the halfway path for the die 212 to access the memory 260 is the port SPI_PAD of the die 212, the port SPI_INTER_PAD of the die 214, and the port SPI_PAD of the die 214, it can be observed that the signal (or the data) of port SPI_PAD of the die 212 is completely the same as the signal (or the data) of the port SPI_INTER_PAD of the die 214 and the signal (or the data) of the port SPI_PAD of the die 214.

At time point t5, the die 212 completes the boot procedure and correspondingly outputs the boot-completion signal 250 from the port BOOT_DONE to the part BOOT_EN_INTER of the die 214. At time point t5, the die 214 receives the high-level boot-enable signal 230 through the port BOOT_EN, and receives the high-level boot-completion signal 250 from the die 212 through the port BOOT_EN_INTER, to stat to execute the boot procedure to access the memory 260. Since the die 214 accesses the memory 260 through the port SPI_PAD, the signal of the port SPI_PAD of the die 214 can be observed.

At time point t6, the die 214 completes the boot procedure and correspondingly outputs the boot-completion signal 252 from its port BOOT_DONE to the port BOOT_EN of the die 222. At time point t6, the die 222 receives the high-level boot-completion signal 252 from the die 214 through the port BOOT_EN, and receives the high-level internal boot-enable signal 240 through the port BOOT_EN_INTER, to start to execute the boot procedure to access the memory 260. Since the halfway path for the die 222 to access the memory 260 is the port SPI_PAD of the die 222, the port SPI_INTER_PAD of the die 224, the port SPI_PAD of the die 224, and the port SPI_PAD of the die 224, it can be observed that the signal of part SPI_PAD of the die 222 is completely the same as the signal of the part SPI_INTER_PAD of the die 224 and the signal of the port SPI_PAD of the die 224.

At time point t7, the die 222 completes the boot procedure and correspondingly outputs the boot-completion signal 254 from its port BOOT_DONE to the port BOOT_EN_INTER of the die 224. At time point t7, the die 224 receives the high-level boot-completion signal 252 from the die 214 through the port BOOT_EN, and receives the high-level boot-completion signal 254 from the die 222 through the port BOOT_EN_INTER, to start to execute the boot procedure to access the memory 260. Since the die 224 accesses the memory 260 through the port SPI_PAD, the signal of the port SPI_PAD of the die 224 can be observed. At time point t8, the die 224 completes the boot procedure, so that the high-level signal can be observed on the port BOOT_DONE of the die 224.

Figure 5:
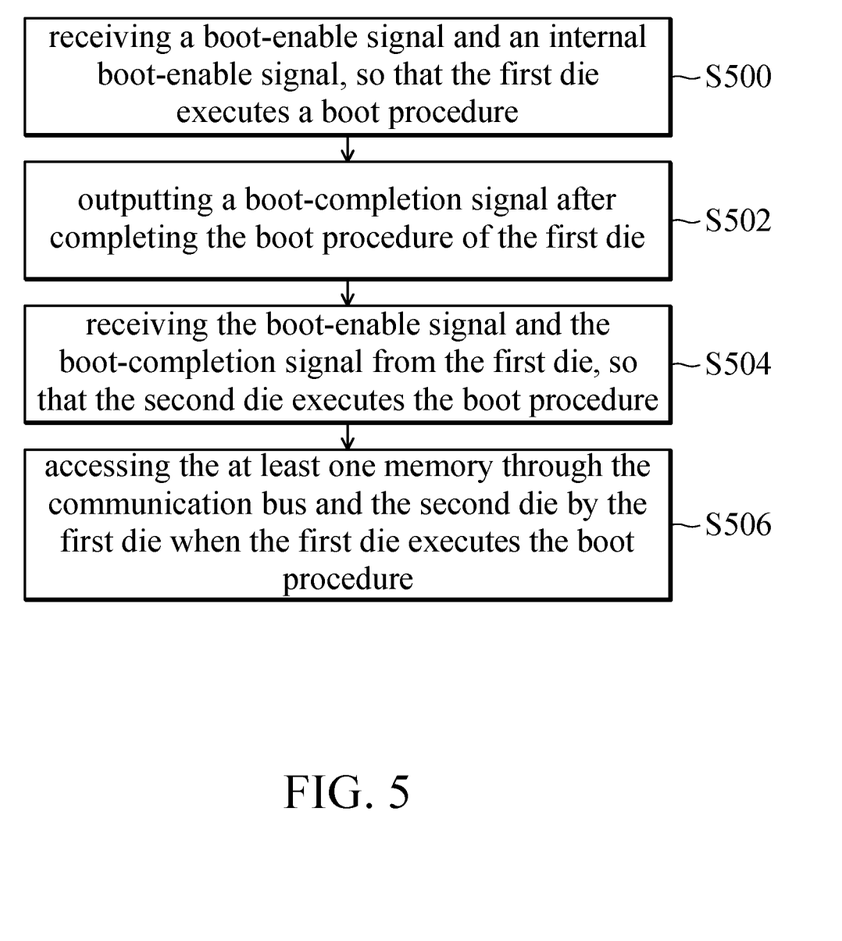
FIG. 5 is a flow chart of a booting method applicable to the processor 100 in FIG. 1 in accordance with some embodiments of the present invention.

FIG. 5 is a flow chart of a booting method applicable to the processor 100 in FIG. 1 in accordance with some embodiments of the present invention. As shown in FIG. 5, the booting method of the processor 100 of the present invention includes the following actions. A boot-enable signal (for example, the boot-enable signal 130 in FIG. 1) and an internal boot-enable signal (for example, the internal boot-enable signal 140 in FIG. 1) are received so that the first die (for example, the die 112 in FIG. 1) may execute a boot procedure (step S500). A boot-completion signal (for example, the boot-completion signal 150 in FIG. 1) is output after the boot procedure of the first die (step S502) has been completed. The boot-enable signal and the boot-completion signal are received from the first die, so that the second die (for example, the die 114 in FIG. 1) may execute the boot procedure (step S504). When the first die executes the boot procedure (step S506), the first die accesses the memory (for example, the memory 160 in FIG. 1) through the communication bus (for example, the communication bus 180 in FIG. 1) and the second die.

Figure 6:
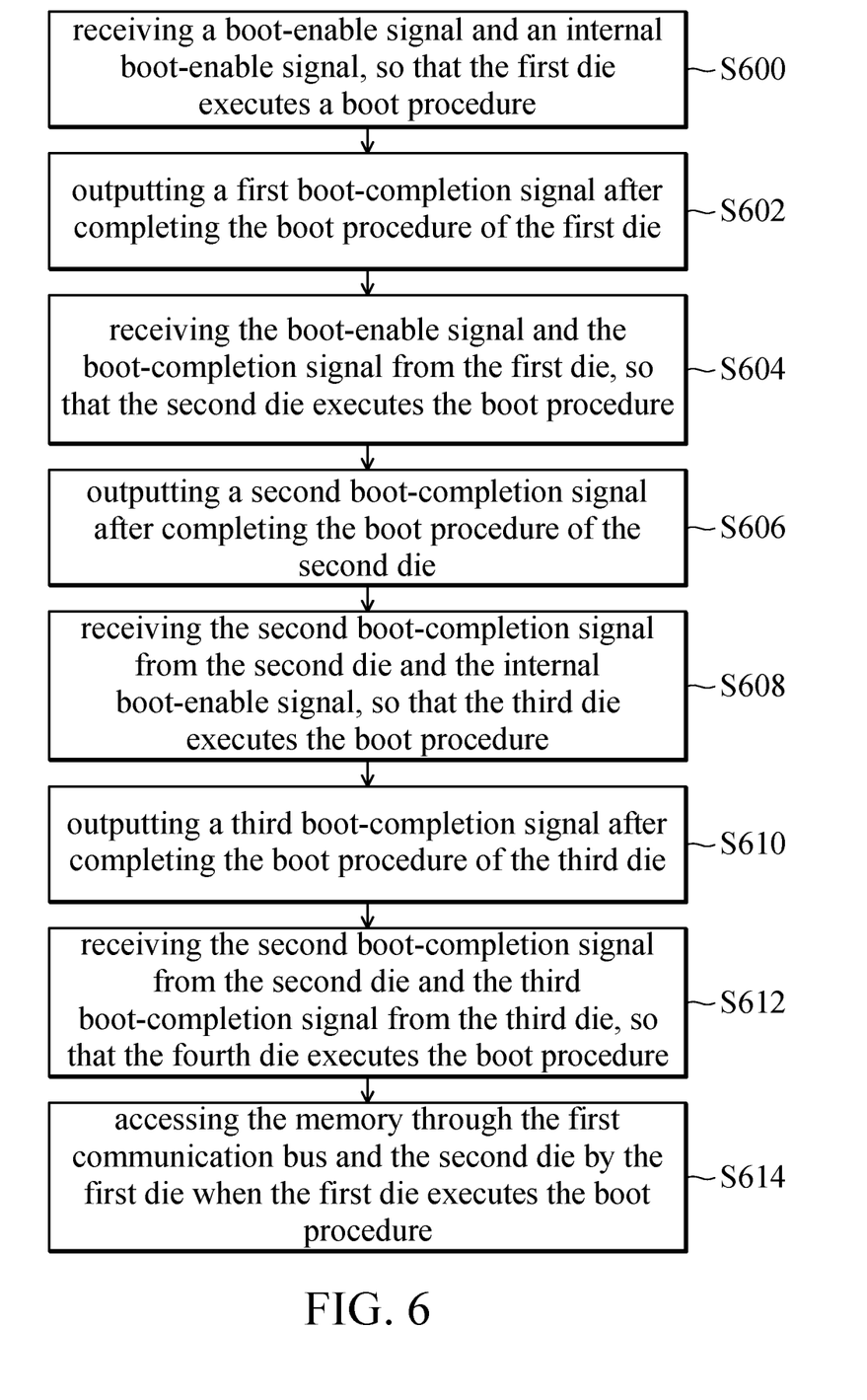
FIG. 6 is a flow chart of a booting method applicable to the processor 200 in FIG. 2 in accordance with some embodiments of the present invention.

FIG. 6 is a flow chart of a booting method applicable to the processor 200 in FIG. 2 in accordance with some embodiments of the present invention. As shown in FIG. 6, the booting method of the processor 200 of the present invention includes the following steps. A boot-enable signal (for example, the boot-enable signal 230 in FIG. 2) and an internal boot-enable signal (for example, the internal boot-enable signal 240 in FIG. 2) are received so that the first die (for example, the die 212 in FIG. 2) may execute a boot procedure (step S600). A first boot-completion signal (for example, the boot-completion signal 250 in FIG. 2) is output after the boot procedure of the first die (step S602) is complete. The boot-enable signal and the boot-completion signal are received rom the first die so that the second die (for example, the die 214 in FIG. 2) may execute the boot procedure (step S604). A second boot-completion signal (for example, the boot-completion signal 252 in FIG. 2) is output after the boot procedure of the second die (step S606) is completed. The second boot-completion signal is received from the second die, and the internal boot-enable signal is also received, so that the third die (for example, the die 222 in FIG. 2) may execute the boot procedure (step S608). A third boot-completion signal (for example, the boot-completion signal 254 in FIG. 2) is output after the boot procedure of the third die is complete (step S610). The second boot-completion signal is received from the second die and the third boot-completion signal is received from the third die, so that the fourth die (for example, the die 224 in FIG. 2) may execute the boot procedure (step S612). When the first die executes the boot procedure (step S614), the first die accesses the memory (for example, the memory 260 in FIG. 2) through the first communication bus (for example, the communication bus 280 in FIG. 2) and the second die.

Other booting methods of the processor 100 and the processor 200 of the present invention have been described in the previous paragraphs, so they will not be repeated. After the boot procedure of each die in the processor 100 in FIG. 1 and the processor 200 in FIG. 2 is completed, the processor 100 and the processor 200 can start the initial power-on process for the ZPI/ZDI link. ZPI is a socket-to-socket interconnection, and ZDI is a die-to-die interconnection. For example, the processor 100 and the processor 200 can configure registers related to physical address, link width, and link speed of the ZPI/ZDI, release the software reset, and configure the linkup process of the ZPI/ZDI.

In the linkup process of the ZPI/ZDI, the software will read the status of the Link Training and Status State Machine (LTSSM) of the ZPI/ZDI, and wait for the LTSSM to enter the L0 state and the DLL file to act. If the current link speed is not the fastest, the software can configure the LCRL register to trigger the link speed of the ZPI/ZDI to the highest speed, and wait for the LTSSM state to reach the L0 state again, the ZPI/ZDI system then completes the linkup process.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangement.

What is claimed is:

1. A processor, comprising:
at least one socket, each of the socket comprises:
a first die, receiving a boot-enable signal and an internal boot-enable signal to execute a boot procedure, and outputting a boot-completion signal after completing the boot procedure;
a second die, receiving the boot-enable signal and the boot-completion signal from the first die to execute the boot procedure; wherein the second die is electrically connected to the first die through a communication bus;
at least one memory, electrically connected to the second die;
wherein when the first die executes the boot procedure, the first die accesses the at least one memory through the communication bus and the second die.

2. The processor as claimed in claim 1, wherein the first die comprises a first communication controller, the second die comprises a second communication controller, and the first communication controller and the second communication controller are configured to control access to the at least one memory.

3. The processor as claimed in claim 2, wherein when the first die executes the boot procedure, the first communication controller accesses the at least one memory through the communication bus, and the second communication controller prohibits access to the at least one memory.

4. The processor as claimed in claim 2, wherein when the second die executes the boot procedure, the first communication controller prohibits access to the at least one memory through the communication bus, and the second communication controller accesses the at least one memory.

5. A processor, comprising:
at least two sockets, one of which comprises:
a first die, receiving a boot-enable signal and an internal boot-enable signal to execute a boot procedure, and outputting a first boot-completion signal after completing the boot procedure;
a second die, receiving the boot-enable signal and the first boot-completion signal from the first die to execute the boot procedure, and outputting a second boot-completion signal after completing the boot procedure;
wherein the second die is electrically connected to the first die through a first communication bus;
the other one of the at least two sockets, comprising:
a third die, receiving the second boot-completion signal from the second die and the internal boot-enable signal to execute the boot procedure, and outputting a third boot-completion signal after completing the boot procedure;
a fourth die, receiving the second boot-completion signal from the second die and the third boot-completion signal from the third die to execute the boot procedure; wherein the fourth die is electrically connected to the third die through a second communication bus;
a memory, electrically connected to the second die and the fourth die;
wherein when the first die executes the boot procedure, the first die accesses the memory through the first communication bus and the second die.

6. The processor as claimed in claim 5, wherein when the first die executes the boot procedure, the second die prohibits access to the memory, the third die prohibits access to the memory through the second communication bus, and the fourth die prohibits access to the memory.

7. The processor as claimed in claim 5, wherein when the second die executes the boot procedure, the second die accesses the memory, the first die prohibits access to the memory through the first communication bus, the third die prohibits access to the memory through the second communication bus, and the fourth die prohibits access to the memory.

8. The processor as claimed in claim 5, wherein when the third die executes the boot procedure, the second die cuts off the electrical connection between the second die and the memory, the third die accesses the memory through the second communication bus, and the fourth die prohibits access to the memory.

9. The processor as claimed in claim 8, wherein when the fourth die executes the boot procedure, the third die prohibits access to the memory through the second communication bus, and the fourth die accesses the memory.

10. The processor as claimed in claim 5, wherein the boot sequence of the processor is the first die, the second die, the third die, and the fourth die.

11. A booting method for a processor, configured to a processor having at least one socket and at least one memory, wherein the at least one socket comprises a first die and a second die, the at least one memory is electrically connected to the second die, and the second die is electrically connected to the first die through a communication bus; the booting method comprising:
receiving a boot-enable signal and an internal boot-enable signal, the first die executes a boot procedure;
outputting a boot-completion signal after completing the boot procedure of the first die;
receiving the boot-enable signal and the boot-completion signal from the first die, so that the second die executes the boot procedure; and
accessing the at least one memory through the communication bus and the second die by the first die when the first die executes the boot procedure.

12. The booting method as claimed in claim 11, wherein the first die comprises a first communication controller, the second die comprises a second communication controller, and the first communication controller and the second communication controller are used to control access to the at least one memory.

13. The booting method as claimed in claim 12, further comprising: accessing the at least one memory through the communication bus via the first communication controller when the first die executes the boot procedure, and prohibiting access to the at least one memory via the second communication controller when the first die executes the boot procedure.

14. The booting method as claimed in claim 12, further comprising: prohibiting access to the at least one memory through the communication bus via the first communication controller when the second die executes the boot procedure, and accessing the at least one memory using the second communication controller when the second die executes the boot procedure.

15. A booting method for a processor, applicable to a processor having at least two sockets and a memory, wherein one of the at least two sockets comprises a first die and a second die, the other one of the at least two sockets comprises a third die and a fourth die, the memory is electrically connected to the second die and the fourth die, the second die is electrically connected to the first die through a first communication bus, and the fourth die is electrically connected to the third die through a second communication bus; the booting method comprising:

receiving a boot-enable signal and an internal boot-enable signal, so that the first die executes a boot procedure;

outputting a first boot-completion signal after completing the boot procedure of the first die;

receiving the boot-enable signal and the boot-completion signal from the first die, so that the second die executes the boot procedure;

outputting a second boot-completion signal after completing the boot procedure of the second die;

receiving the second boot-completion signal from the second die and the internal boot-enable signal, so that the third die executes the boot procedure;

outputting a third boot-completion signal after completing the boot procedure of the third die;

receiving the second boot-completion signal from the second die and the third boot-completion signal from the third die, so that the fourth die executes the boot procedure; and accessing the memory through the first communication bus and the second die via the first die when the first die executes the boot procedure.

16. The booting method as claimed in claim 15, further comprising: prohibiting access to the memory by the second die when the first die executes the boot procedure; prohibiting access to the memory through the second communication bus by the third die when the first die executes the boot procedure; and prohibiting access to the memory by the fourth die when the first die executes the boot procedure.

17. The booting method as claimed in claim 15, further comprising: accessing the memory by the second die when the second die executes the boot procedure; prohibiting access to the memory through the first communication bus by the first die when the second die executes the boot procedure; prohibiting access to the memory through the second communication bus by the third die when the second die executes the boot procedure; and prohibiting access to the memory by the fourth die when the second die executes the boot procedure.

18. The booting method as claimed in claim 15, further comprising: cutting off the electrical connection between the second die and the memory by the second die when the third die executes the boot procedure; accessing the memory through the second communication bus by the third die when the third die executes the boot procedure; and prohibiting access to the memory by the fourth die when the third die executes the boot procedure.

19. The booting method as claimed in claim 18, further comprising: prohibiting access to the memory through the second communication bus by the third die when the fourth die executes the boot procedure; and accessing the memory by the fourth die when the fourth die executes the boot procedure.

20. The booting method as claimed in claim 15, wherein the boot sequence of the processor is the first die, the second die, the third die, and the fourth die.

* * * * *